March 19, 1935.  H. C. FLINT  1,995,260
FOLDING SUPPORT
Filed July 12, 1933  5 Sheets-Sheet 1
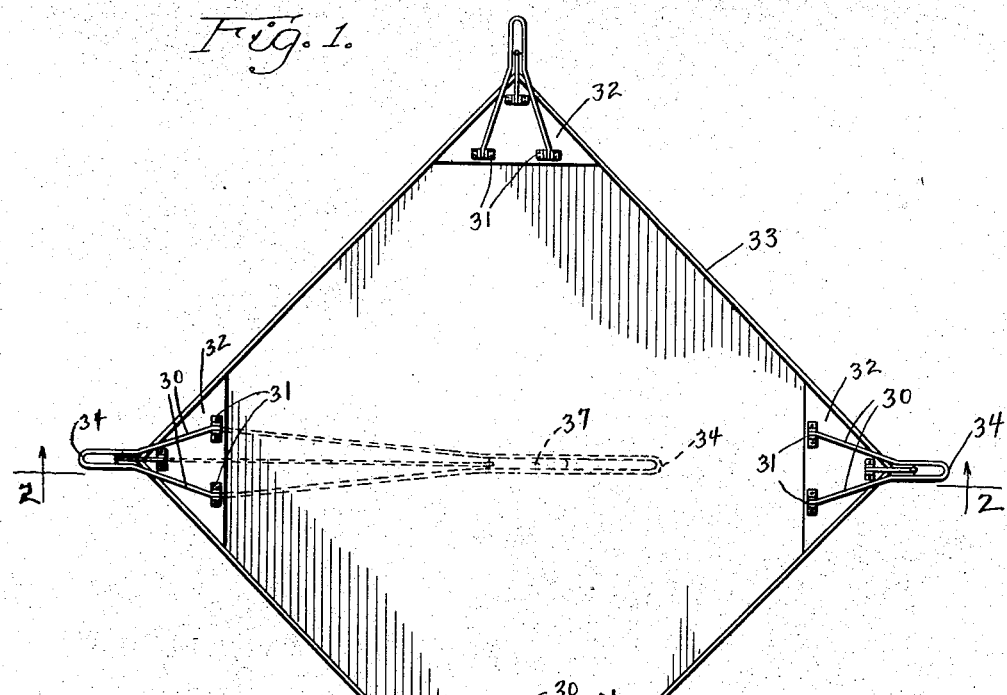
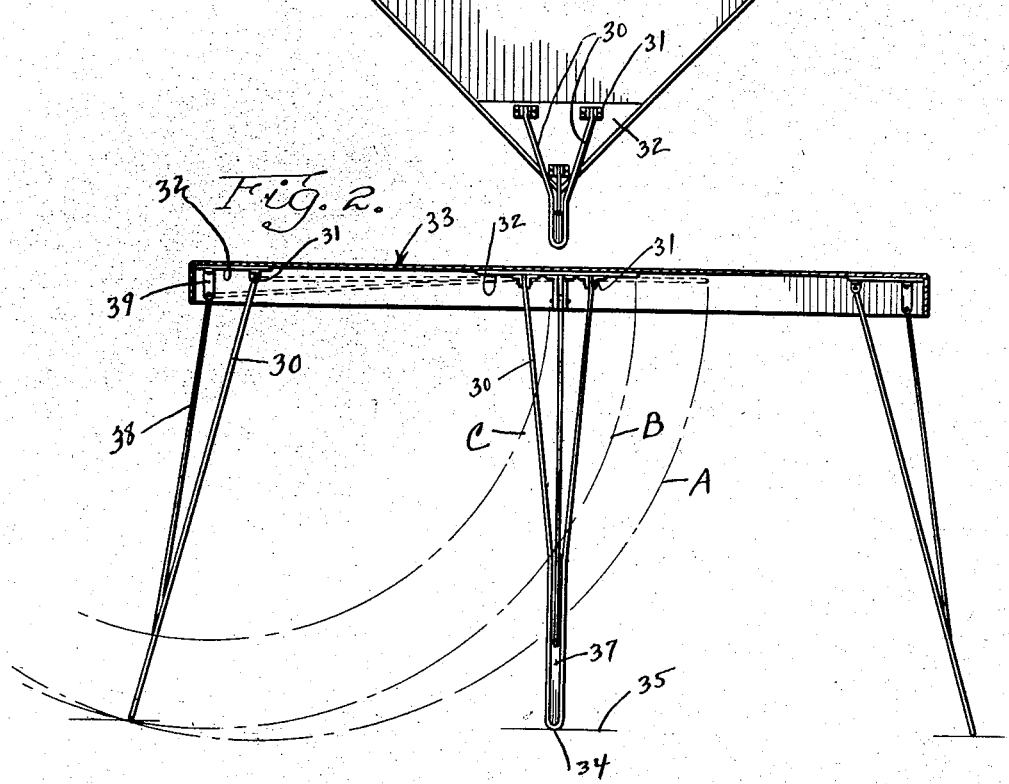
Inventor
Hyland C. Flint.

March 19, 1935.    H. C. FLINT    1,995,260
FOLDING SUPPORT
Filed July 12, 1933    5 Sheets-Sheet 2
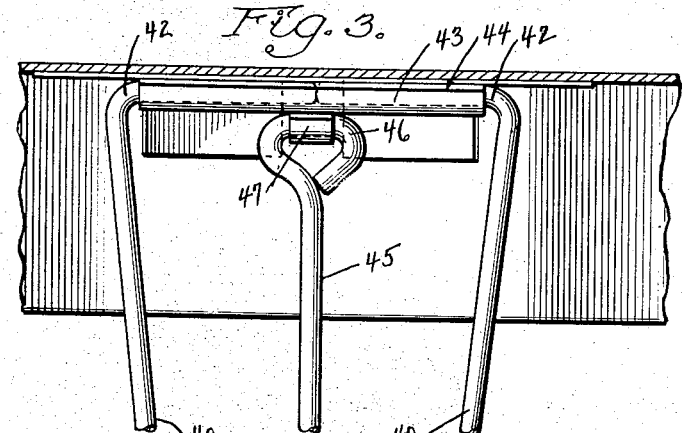
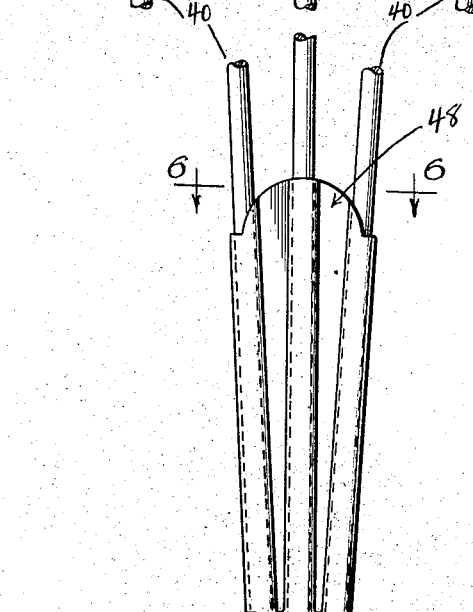
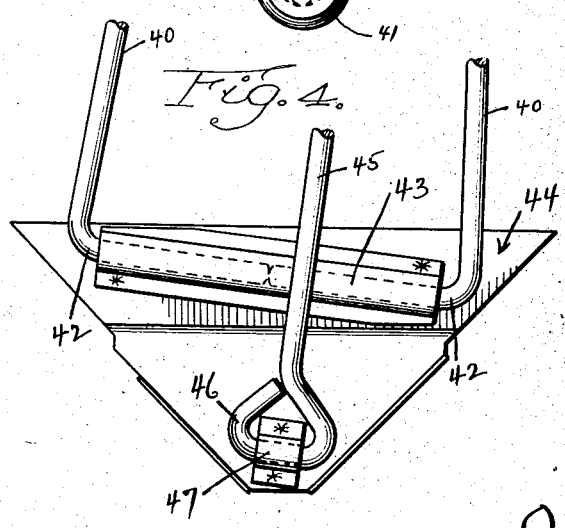
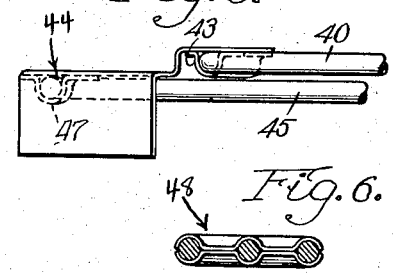
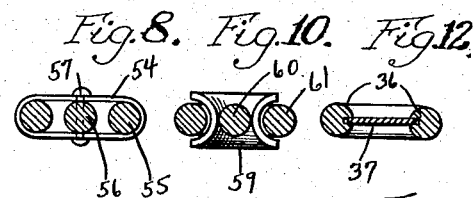
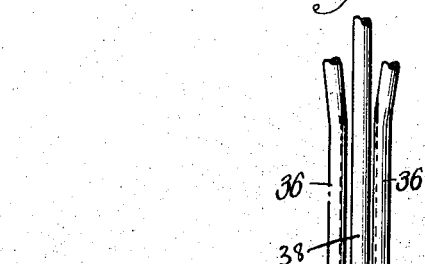
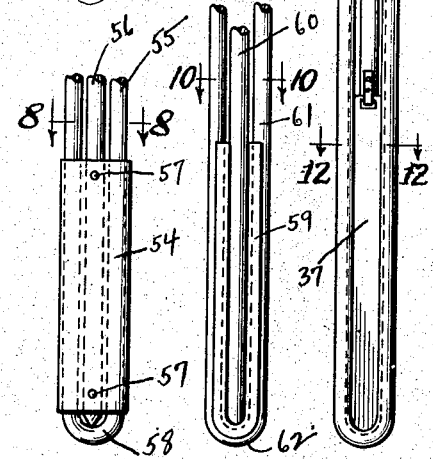
Inventor
Hyland C. Flint
Jones, Addington, Ames & Seibold
Attys.

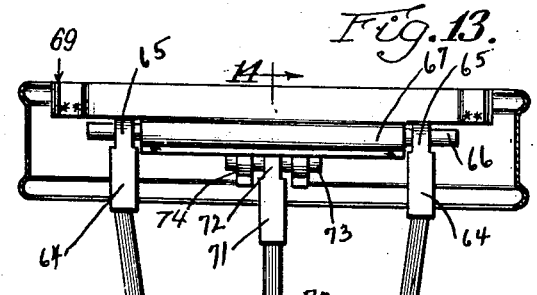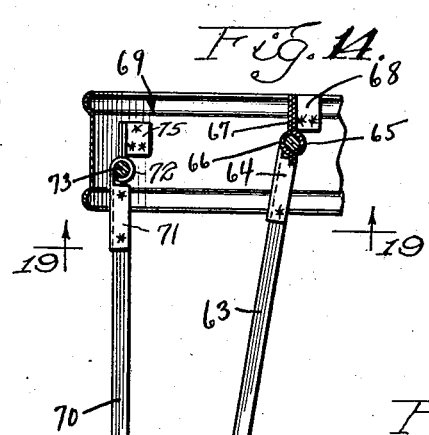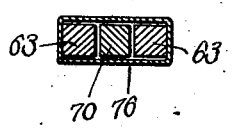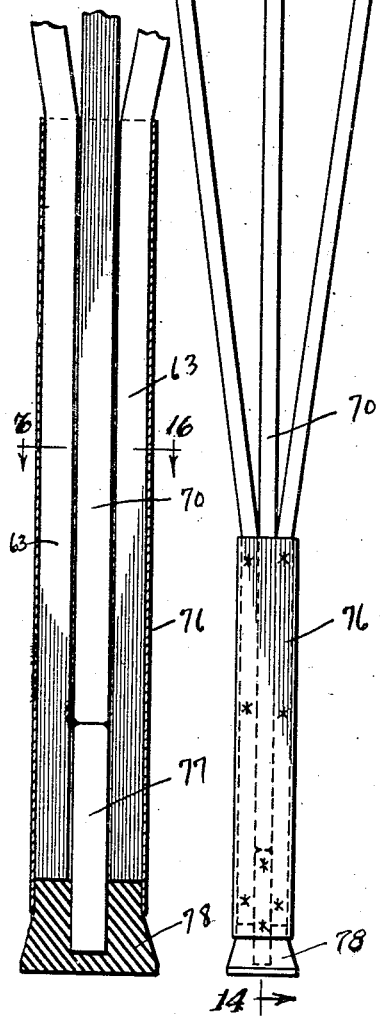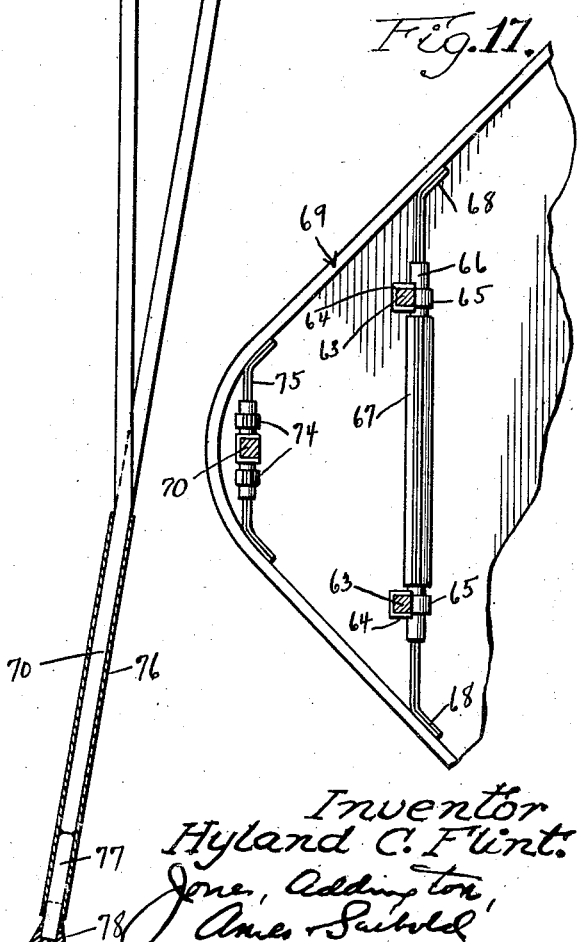

March 19, 1935.  H. C. FLINT  1,995,260
FOLDING SUPPORT
Filed July 12, 1933  5 Sheets-Sheet 4

Inventor
Hyland C. Flint.
Jones, Addington, Ames & Seibold
Attys.

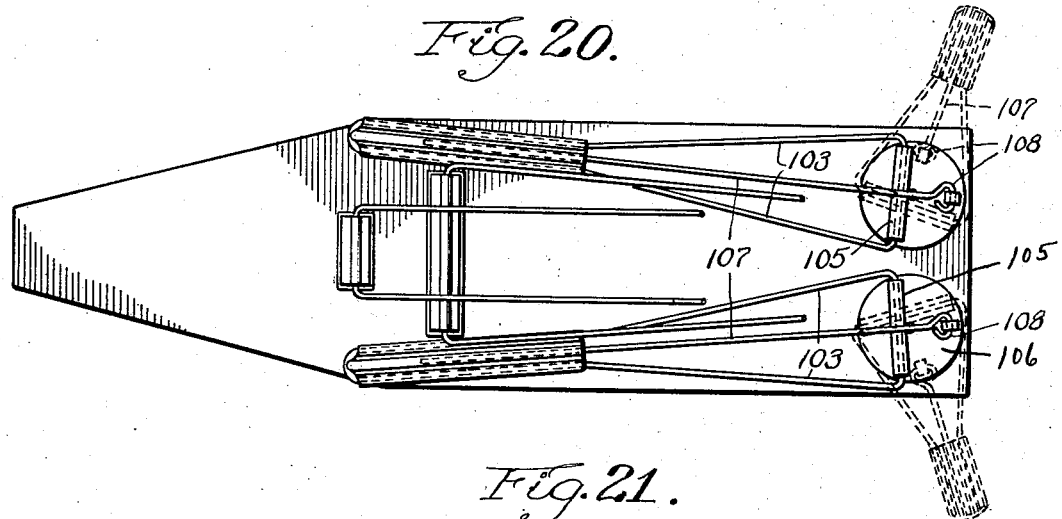
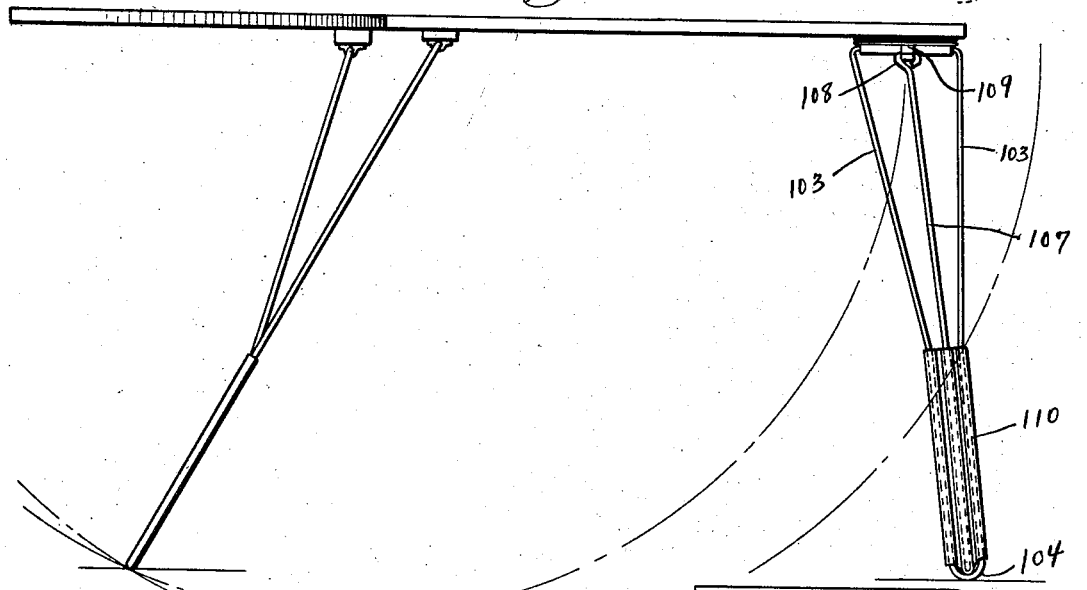
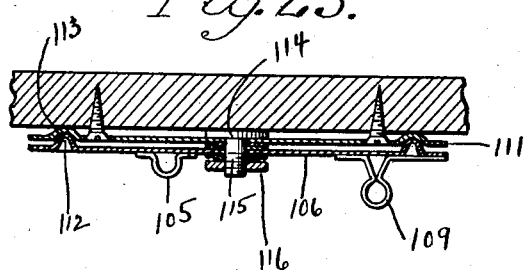

Patented Mar. 19, 1935

1,995,260

UNITED STATES PATENT OFFICE 1,995,260

FOLDING SUPPORT

Hyland C. Flint, Chicago, Ill.

Application July 12, 1933, Serial No. 680,098

4 Claims. (Cl. 311—98)

This invention relates to a folding support and has special reference to a folding leg structure for use in connection with tables, ironing boards, chairs, and the like, which are adapted to be folded into a condition such that they may occupy a minimum of space in storage.

More particularly, this invention relates to a folding support comprising a leg pivoted to a supported member such as a table, ironing board, chair, and the like, and a brace pivoted to the supported member at another position thereon for slidable engagement with the leg, the brace limiting the movement of the leg in the full extended position thereof from a position adjacent the supported member.

Applicant contemplates particularly the provision of a leg construction which may be formed from wire rods of circular or polygonal cross-section or other light weight material so constructed and arranged as to provide a maximum strength and rigidity for purposes of supporting the supported object. It is, of course, to be understood that the principles of this invention may be employed in the use of various types of materials other than wire rods, such as channels, tubing, or the use of sheet metal bent into various forms, since the forms illustrated merely teach that a maximum strength may be obtained in the use of relative light weight materials, when so constructed and arranged as aforesaid, to obtain a desired rigidity which, of course, may likewise be obtained in the use of heavier sheet metal construction with corresponding advantageous results.

One of the objects of this invention is to provide a folding support of the type hereinafter described in which a maximum strength of the construction is obtained in the use of a minimum weight of material.

A further object of this invention is to provide a folding support of the type above referred to which is simple to operate, comparatively inexpensive to manufacture, and is rigid and durable in construction.

A still further object of this invention is to provide a folding support of the type above noted in which the support moves from a folded position to an extended position over an arc supported by an angle beyond 90 degrees.

Also, it is the object of this invention to provide a folding support of the type above referred to in which an arc described by the brace thereof intersects an arc described by the leg at the full extended position of the leg on the floor.

Another object of this invention is to provide a folding support of the character noted above in which the brace is pivotally supported between the outer confines of the supported member and the pivotal connection for the leg.

Other objects and advantages will hereinafter be more particularly pointed out and for a more complete understanding of the characteristic features of this invention, reference may now be had to the following description when taken together with the accompanying drawings, in which latter:

Figure 1 is a bottom view of a table embodying the features of this invention;

Fig. 2 is a central vertical sectional view taken on the line 2—2 of Figure 1;

Fig. 3 is an enlarged elevational view of a modified form of folding support embodying the features of this invention, showing a central portion thereof broken away and showing the support as attached to a fragmentary portion of a table, which latter is shown in section;

Fig. 4 is a bottom view of a fragmentary portion of the folding support shown in Fig. 3 as removed from the table;

Fig. 5 is a side elevational view of Fig. 4;

Fig. 6 is a sectional view taken on the line 6—6 of Fig. 3;

Figure 18:
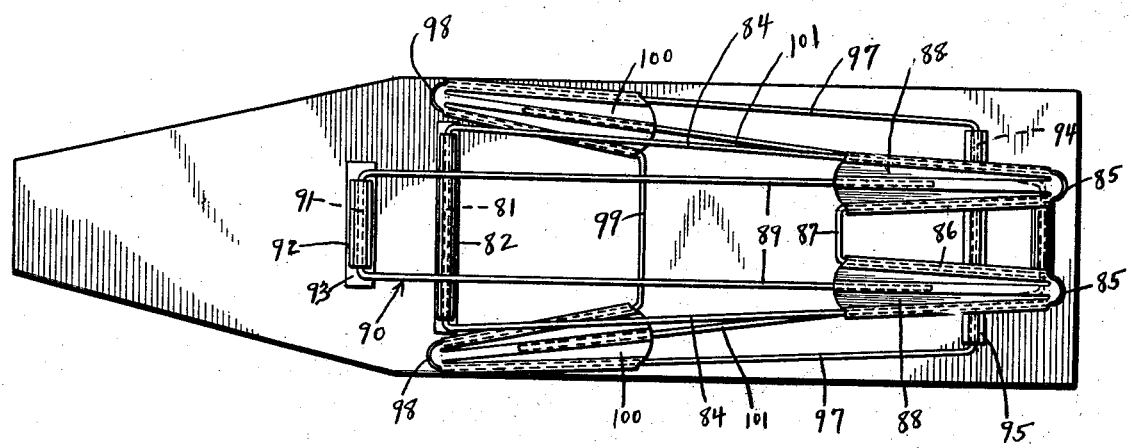
Figure 19:
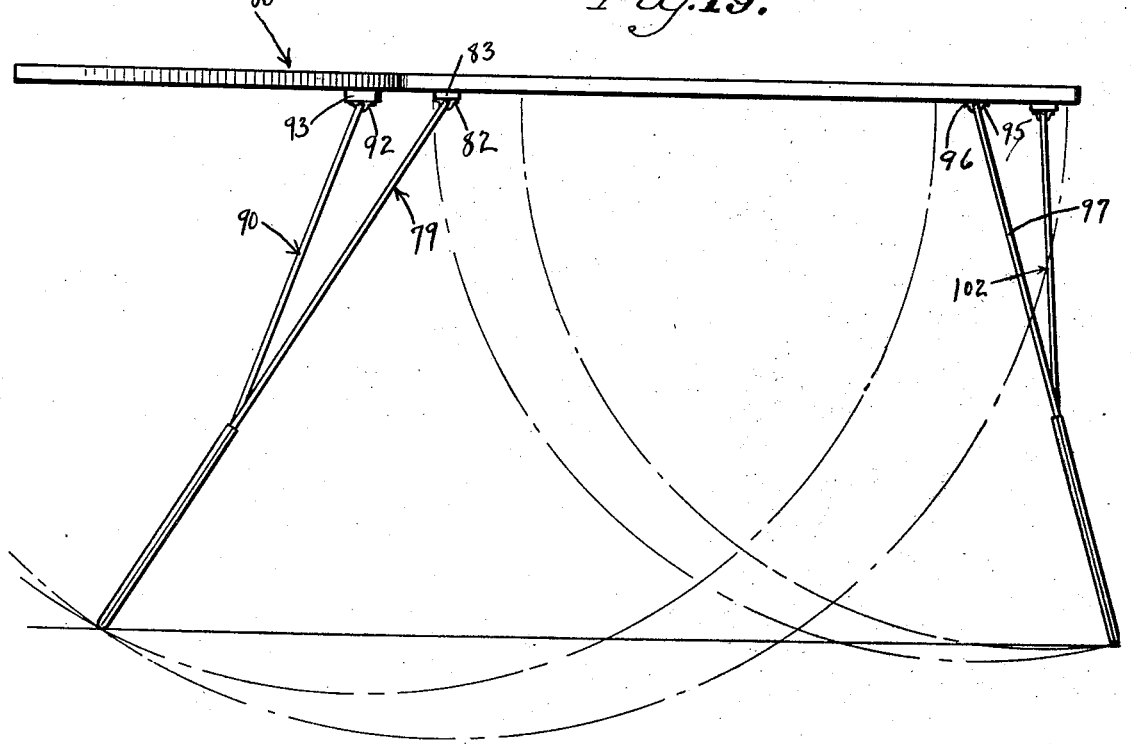

Figs. 7, 9, and 11 are elevational views of modified forms of fragmentary portions of folding supports;

Figs. 8, 10, and 12 are sectional views respectively of Figs. 7, 9, 11 and 13 taken on the lines indicated in the latter respective figures;

Fig. 13 is an elevational view of a still further modification of a folding support showing it connected to a fragmentary portion of a table shown in section;

Fig. 14 is a vertical sectional view taken on the line 14—14 of Fig. 13;

Fig. 15 is an enlarged face view of the bottom portion of a folding support construction shown in Fig. 13 with a portion thereof in section;

Fig. 16 is a sectional view taken on the line 16—16 of Fig. 15;

Fig. 17 is a view taken on the line 17—17 of Fig. 14;

Fig. 18 is a bottom view of an ironing board showing another modified form of folding support embodying the principles of this invention with the support in a collapsed condition;

Fig. 19 is a side elevational view of the structure shown in Fig. 18 with the folding support shown in an extended condition;

Fig. 20 is a view similar to Fig. 18 showing a modified form of a rear folding support construction with the legs in a folded condition, the rear folding support being shown in dotted lines in an extended condition;

Fig. 21 is a side elevational view of the construction shown in Fig. 20 with the folding support in an extended condition;

Fig. 22 is a rear elevational view of Fig. 21 with a portion thereof broken away; and Fig. 23 is an enlarged central vertical sectional view of one of the bases for the folding support shown in Figs. 20 to 22, inclusive, as mounted in a table portion shown in section.

Referring now to the drawings, and more particularly to Figs. 1 and 2 thereof, the device of this invention comprises a folding support having a leg 30 pivoted on brackets 31, which latter extend from a plate 32 on the underneath side of a supported member, such as a table top 33. In the embodiment shown, the leg 30 is formed of a single piece of wire rod about a quarter of an inch in diameter formed into a substantial U-shape, the ends thereof being spread a substantial distance apart and having apertures for receiving pins extending through the brackets 31.

The intermediate portion of the wire forms a loop 34 for engagement with a floor, the floor line being indicated by the numeral 35. The U-shaped wire of the leg 30 extends substantially parallel over the lower portion of the leg, whereafter the ends separate gradually to a substantially spaced relation for pivotal connection with the brackets 31, as hereinbefore stated. The substantially parallel portions of the leg, as shown more particularly in Figs. 11 and 12, are provided with opposed guideways in the form preferably of saw kerfs 36 for receiving the opposite edges of a guide 37, which latter has slidable movement therein longitudinally of the leg. The guide 37 in these figures occupies an open or fully extended position, a closed or folded position of the leg moving the guide to a position shown in dotted lines in Figure 1.

A brace 38 preferably comprised of a wire rod similar to that of the leg 30, has one of its ends pivotally secured to a bracket 39 extending from the plate 32 of the supported member, the other end of the brace being pivotally connected to the upper end of the guide 37.

Although not essential, it has been deemed desirable in the present instance to extend the pivotal connection on the bracket 39 a substantial distance further from the plate to which it is secured than the pivotal connection for the bracket 31. The advantage in thus disposing the pivotal centers in different planes resides in the fact that when folded the support will tend to rest against the supported member without danger of displacement therefrom excepting by manual force. It is, however, to be understood that the centers of the pivotal connections may be in the same plane and operate satisfactorily.

It will be noted that a folding support, as a unit, is disposed in each of the four corners of a table top 33. The table, of course, may be of any polygonal contour or it may be round to receive a greater number of folding supports or a lesser number, as desired, since a three-point suspension is preferable in some instances in order to insure all of the legs resting on the floor. However, it has been proven satisfactory to equip tables with four legs or more, which custom has been followed to a greater extent in general practice without lessening the desirability for such structure.

The length of the combined brace 38 and guide 37 is less than that of the leg 30 and applicant urges this construction as a feature of his invention. The bracket 39 is disposed outwardly or toward the outer confines of the supported member from the bracket 31 whereby a movement of the leg and brace from a folded position, as indicated in dotted lines in Fig. 2, to a fully extended condition passes the vertical, the end of the guide setting against the loop 34 to limit the movement of the leg. The arc thus described by the brace and the leg subtends an angle which is greater than 90 degrees and the leg is, therefore, extended at an angle to the vertical. When the leg, therefore, is in an extended condition and rests on the floor the weight on the table or of the table is distributed between the leg 30 and the brace and guide members 37 and 38, respectively.

When it is desired to fold the support, the leg describes an arc, the radius of which is greater than the shortest distance from its pivotal point to the floor, as shown by the arc A so that a folding of the leg is obviated except upon a movement upwardly of the table from its normal supported position. The leg, therefore, when extended is in a securely locked condition even though no separate positive lock is employed, the locking being inherent in the construction. An arc B described on the pivotal point of the brace 38 will intersect the arc A described from the pivotal point of the leg 30 at the point at which the leg rests on the floor. Thus, the leg describes an arc from a folded position adjacent the member to an extended position with the free end resting on the floor, the movement of the leg being arrested by the brace at the intersection of the arcs of the brace and leg.

It is, of course, to be understood that a movement of the guide 37 may be arrested at any point on the leg 30, although for illustrative purposes the movement of the guide 37 has been arrested by the loop 34. The guide may have a movement over an intermediate portion of the leg to be arrested by a pin or other means at any intermediate point. However, as shown in Fig. 2 in dotted lines, the guide 37 occupies a position spaced from the loop 34 between the arcs B and C. The movement of the guide relatively to the leg is shown by the continuation of the arcs B and C to the point of intersection of arcs A and B, whereafter if the loop 34 did not arrest the movement of the guide 37, then the guide would extend below the end of the leg a distance increasing with the outward movement of the leg from the table.

Referring now more particularly to Figs. 3 to 6, inclusive, a folding support is shown comprising a continuous strip of wire forming a leg 40, the wire having a loop portion 41 substantially centrally thereof for engagement with the floor and the ends of the wire extending upwardly therefrom in a diverging relation, the extreme upper ends 42 of the wire being turned inwardly toward each other to meet centrally in a bearing 43, which latter is spot-welded or otherwise secured to a plate 44.

A brace 45 has an upper end 46 looped to extend through a bearing 47, which latter is spot-welded or otherwise secured to the plate 44. The lower end of the brace 45 extends downwardly between the wires of the leg 40 for slidable engagement with a guide 48, which latter is fixedly secured to the leg 40. The guide 48 in this instance preferably comprises a pair of plates, each having substantially semi-circular longitudinally extending recesses along the outer edges thereof which, when the plates are secured together, form pockets for surrounding the wire of the leg 40. Each of the plates is also provided with a substantially semi-circular central longitudinally extending recess which, when the plates are secured together, form a pocket for receiving the lower end of the brace 45 in frictional slidable engagement therewith. The portions of the guide 48 intermediate the recessed portions meet and are preferably spot-welded together or otherwise suitably fastened.

The plate 44 may preferably be offset at one portion thereof for permitting the bearings 43 and 47 to occupy different vertical planes, thus permitting the leg to be folded flat against the table and the brace 45 to hold the leg against displacement from the table except by manual force, as previously described in connection with the first mentioned form of construction. It will be noted that the bearing 43 is substantially elongated and engages the ends 42 of the wire leg over a substantial distance to provide an element of stability and rigidity to the folding support.

The brace 45 in its movement to follow the leg 40 from a folded position to an extended position slides in the pocket formed in the guide 48 and strikes against the loop end 41 of the leg 40 when the latter is in its full extended position, such position being the same as that shown in Fig. 2, wherein the arcs described by the brace and legs intersect beyond the perpendicular. The brace 45 is, as in the previously recited embodiment, shorter than the leg which permits a movement of over 90 degrees from its substantially horizontal position adjacent the table to its full extended position beyond the vertical. The same result is obtained in this embodiment as in the previously described embodiment, the weight of the table being distributed between the leg 40 and the brace 45 and there being a downward thrust on both members to effect a locked condition without the addition of the common expedient known as a lock.

The guiding means 54 shown in Figs. 7 and 8 has slidable engagement with the leg 55, the guide 54 being secured to the lower end of the brace 56 as by means of pins 57. The guide 54 is preferably formed as a sleeve to envelop the continuous wire of the leg 55 and the brace 56, the outer edges of the sleeve being shaped to conform to the contour of the wire and to snugly engage thereagainst to provide a frictional resistance against relative movement therebetween. The brace 56 extends through the guide to abut against a looped central portion 58 in the relative movement between the guide and the leg from a folded position to a full extended position thereof.

Instead of enveloping the wire or rod forming the leg 55, it may be desirable to provide for a frictional resistance by engagement with the interior contours of the leg and such a construction is shown in Figs. 9 and 10 wherein a guide 59 is comprised preferably of a sheet metal stamping for fixed engagement with a brace 60 at the lower end thereof, the opposed edges of the guide 59 being substantially semi-circular in cross-section for engaging the opposed interior faces of the wires forming a leg 61. The guide in this embodiment follows the brace in its relative movement with the leg from a folded condition adjacent the supported member to an extended condition on the floor, the end of the guide abutting a loop 62 of the intermediate portion of the wires of the leg 61.

Referring now more particularly to Figs. 13 to 17, inclusive, the construction shown therein embodies the use of a polygonal wire or rod, the illustration in the drawings being square in cross-section. In this embodiment the leg of the folding support is formed of a pair of square rods 63 and for purposes of illustration they are not continuously formed but are two separate elements. It is, of course, to be understood that these members may be of a single continuous piece, if desired. The upper ends of the rod 63 are provided with collars 64, the latter having preferably integrally formed bearing portions 65 extending therefrom for engaging a shaft 66 in a substantially spaced relation. The shaft 66 is, in turn, mounted in a bearing 67 which is preferably formed of a pair of sheet metal members spot-welded or otherwise secured at the ends thereof as at 68 across a corner of a table 69.

The lower ends of the rods 66 extend in a substantially parallel spaced relation over a substantial portion thereof, the space therebetween being substantially the size of a rod 70, which latter has slidable engagement therebetween and forms the brace for limiting the movement of the members 63 forming the leg. The upper end of the brace 70 is provided with a collar 71 having an extending bearing portion 72 for pivotally engaging a shaft 73 supported from bearings 74 extending from brackets 75. The ends of the brackets 75 are, in turn, secured to the table top 69 preferably at the depending edges thereof as by means of welding or the like.

The lower substantially parallel extending portions of the rod 63 are preferably enveloped by a casing 76 which casing is preferably spot-welded to the rods 63. The brace 70, therefore, has longitudinal slidable movement between the rods 63 and is held against displacement laterally of the rods by means of the rods and the casing 76. A stop 77 is provided between the ends of the rods 63 to limit the downward movement of the brace 70. The stop 77 may likewise be spot-welded to the casing 76 or otherwise secured to the ends of the rods 63 to be held in a fixed relation therewith.

The casing 76 preferably extends below the bottom of the rods 63 to provide a pocket for receiving a reduced end portion of a foot 78, which latter is preferably formed of rubber and has a central depression for receiving the lower end of the stop 77. The rubber foot at the end of the table is preferably employed to prevent creeping of the table along the floor, although, of course, it is to be understood that this construction is merely a preferred form and that the leg extremities may be otherwise provided.

The folding action of the supporting structure thus above recited is similar in all respects to that previously recited with respect to the modifications hereinbefore described. As the leg 63 moves upwardly from its position shown in Fig. 14, the brace 70 follows the movement thereof and by reason of the brace being pivoted at a different position than the pivotal point for the leg, a relative movement is had therebetween and the end of the brace moves upwardly in the guideway provided by the spacing of the rods and the casing 76. The brace snugly engages the guideway and prevents accidental displacement of the leg from its folded position at the table top, although this action may be augmented by the positioning of the pivotal members for the respective brace and leg off-center relatively to a horizontal plane as previously recited in connection with the previously described modifications, the shaft 73 being lower than the shaft 66.

A movement of the leg and brace members from a folded position to an extended position is likewise accomplished in the manner indicated previously, the movement of the leg 63 being arrested, in a position beyond the vertical or after a movement of over 90 degrees, by the brace 70 abutting the stop 77. This limitation of movement is at the intersection of arcs described by the brace and leg members, as has also been previously recited.

Referring now more particularly to Figs. 18 and 19, a folding support is shown embodying the features of this invention in which but two sets of supports are employed. It is desirable in such an instance to obtain the effect of three or more legs for the purposes of rigidity, although confining the same to a unitary construction of a single leg. One of the folding supports preferably comprises a leg member 79 positioned at the forward or tapered end of an ironing board top 80, the leg being formed preferably of a single continuous wire having a portion 81 extending laterally of the table over a substantial portion thereof and being pivotally held in a secured relation with the portion by a bearing 82 mounted on a block 83, which latter is screwed or otherwise secured to the underneath side of the ironing board. Portions 84 of the wire forming the leg are bent from each side of the laterally extending portion 82 at the edges of the bearing therefor and extend longitudinally (when viewed in a folded position) to the length desired to form a pair of spaced loops 85 which act as feet for resting on the floor.

The portions 86 from the loops 85 extend in an opposite direction longitudinally of the ironing board for a substantial distance and then laterally in a portion 87 to complete the double leg. The same type of guides 88 are employed as that shown in Fig. 3, each of the guides preferably comprising a pair of plates, each plate having substantially semi-circular longitudinally extending recesses along the outer edges thereof which, when the plates are secured together, form pockets for surrounding the lower portions 84 and 86 of the wire. The guide plates are secured to the wire portions previously described in any suitable manner and are each provided with central longitudinally extending recesses forming pockets for receiving the lower spaced ends 89 of a brace 90, the intermediate portion 91 of the brace extending laterally and being pivotally journalled in a bearing 92, which latter is mounted on a block 93 secured to the bottom of the ironing board 80.

As shown in the drawings, the brace 90 comprises a single piece of wire having a laterally extending intermediate portion which is pivotally secured underneath the table, the end portions 89 of the brace slidably engaging pockets formed in the guides 88. It is, of course, to be understood that, in ironing board constructions, it may be feasible and has been found to be desirable to have merely a single point engagement with the floor at the forward end. The construction just recited may, of course, be modified to meet this condition with the substitution, for example, of the leg construction shown in Fig. 3 for that just described. However, it has been found desirable in this instance to show an alternative form of unitary construction wherein a two-point contact may be had with the floor at the forward end of the ironing board.

A very much similar construction has been shown at the rear end of the board, the only essential difference being that the floor-engaging portions of the leg are more widely separated than the floor-engaging portions at the forward end of the table. The leg construction at the rear end of the board comprises preferably a single continuous wire rod having a laterally extending portion 94 pivotally engaging a bearing 95 secured to a block 96 on the underneath side of the ironing board 80. Portions 97 of the wire are bent from the laterally extending portion 94 to extend longitudinally (when viewed in a folded position) to form spaced loops 98 at the lower extremities thereof, the portions adjacent the loop being bent back in a longitudinal direction a substantial distance to a laterally extending portion 99. Guides 100 are mounted at the looped ends in the same manner as that previously recited in connection with the forward leg construction to form pockets for receiving ends 101 of a brace 102 in slidable frictional engagement therewith.

To unfold the support, each of the legs describe an arc which will intersect arcs described by each of the braces at the point on which the legs rest on the floor, the movement of the legs being arrested by the braces in the manner previously described with reference to Fig. 3. When it is desired to fold the support each of the legs describe an arc which is greater than the shortest distance from its pivotal point to the floor and such movement is only possible upon an upward movement of the ironing board from its normal supporting position. The legs, therefore, are in a securely locked condition even though no separate positive lock is employed, the locking of the legs being inherent in the construction. The weight of the table or of the objects upon the table lock the legs and the legs are only relieved from such locking condition by manual manipulation to raise the board to permit the legs to swing past a vertical position. The leg, of course, is substantially greater than the shortest distance between the pivotal support and the floor, thus necessitating such action. Also, the brace is shorter than the leg whereby the movement from a folded position to a fully extended position is greater than an angle of 90 degrees and substantially past the vertical when the supported member occupies normally a substantially horizontal position.

Referring now more particularly to Figs. 20 to 23, inclusive, an ironing board is shown embodying the folding support features of this invention in which the forward folding support is shown as being identical with that forward folding support shown in Figs. 18 and 19. Therefore, a further description of this member is believed unnecessary. However, in connection with the rear legs, it will be noted that instead of being a single unitary construction, a pair of separate legs are employed, each of which are operable independently into and out of folded position adjacent the board.

The separate legs are adapted to swivel to extend a substantial distance beyond the confines of the board and when folded may be swivelled to extend within the confines of the board. Each of the legs, therefore, may comprise a continuous strip of wire 103 having a loop portion 104 substantially centrally thereof for engagement with the floor, the ends of the wire extending upwardly therefrom substantially parallel for a short distance and thereafter in a diverging relation, the extreme upper ends of the wire being turned inwardly to meet centrally in a bearing 105, the bearing being spot-welded or otherwise secured to a plate 106. A brace 107 has an upper end 108 looped to extend through a bearing 109, which latter is spot-welded or otherwise secured to the plate 106. The lower end of the brace 107 extends downwardly between the wires 103 of the leg for slidable engagement with the guide 110, which latter is fixedly secured to the wires 103 of the leg. The guide 110 in this instance is similar in substantially all respects to the form shown in Fig. 3 with the exception that the wires 103 have been formed substantially parallel over a portion of the lower length thereof adjacent the loop.

The plate 106 is preferably annular and, by referring to Fig. 23, is mounted to rotate on a second plate 111. In order to relieve undue friction between the plates an annular peripheral portion 112 is deformed to extend above the surface of the plate to seat in a similarly formed portion 113 in the plate 111. The latter plate is secured to the underneath side of the ironing board as by means of screws or the like, and is thereby held against rotation. Both plates are mounted on a stud 114, the stud having a threaded reduced portion 115 extending therefrom, which latter acts as a bearing about which the plate 106 swivels, the plate 106 being held on the reduced threaded portion 115 by a nut 116.

In a folded condition, the supporting legs are swivelled toward each other to fit within the confines of the ironing board. However, when it is desired to extend the folding supports to an operative position, the legs may be swivelled, the plate 106 carrying the legs moving about the plate 111 to any desired position, whereafter each leg may be operated individually in the same manner as that previously described with reference to the card table units or as shown more particularly in Fig. 3. It will then be noted that the legs may assume a substantial spread to guard against tilting of the table.

While several embodiments of this invention are herein shown and described, it is to be understood that various modifications thereof may be apparent to those skilled in the art without departing from the spirit and scope of this invention and, therefore, the same are only to be limited by the scope of the prior art and the appended claims.

I claim:

1. In a folding support, a leg comprising a pair of spaced rods pivoted to a supported member and movable from a folded position adjacent said member to an extended position beyond a ninety degree angle therewith with the free end resting on the floor, and a brace of fixed length having one end pivoted to said supported member at a position thereon spaced from the pivotal connection of said rods, said spaced rods forming a guideway for slidably receiving the other end of said brace and for limiting the extended position thereof.

2. In a folding support, a leg comprising a single rod bent in substantial U-shaped forming arms with the ends pivoted to a supported member and movable from a folded position adjacent said member to an extended position beyond a ninety degree angle therewith with the looped intermediate portion resting on the floor, and a brace of fixed length having one end pivoted to said supported member at a position thereon spaced from the pivotal connection of said arms, said spaced arms forming a guideway for slidably receiving the other end of said brace and for limiting the extended portion thereof.

3. In a folding support, a leg comprising a pair of spaced rods pivoted to a supported member and movable from a folded position adjacent said member to an extended position beyond a ninety degree angle therewith with the free end resting on the floor, a brace of fixed length having one end pivoted to said supported member at a position thereon spaced from the pivotal connection of said rods, said spaced rods forming a guideway for slidably receiving the other end of said brace, and means in said guideway for engaging said brace to limit the extended position thereof.

4. In a folding support, a leg having a guideway rigid therewith and being pivoted to a supported member, said leg being movable from a folded position adjacent said member to an extended position beyond a ninety degree angle therewith with the free end resting on the floor, and a brace of fixed length having one end pivoted to said supported member at a position thereon spaced from the pivotal connection of said legs, said guideway slidably receiving the other end of said brace and limiting the extended position thereof.

HYLAND C. FLINT.